(12) United States Patent
Kaneko

(10) Patent No.: US 6,191,082 B1
(45) Date of Patent: Feb. 20, 2001

(54) LUBRICATING OIL FOR FLON REFRIGERANT

(75) Inventor: Masato Kaneko, Ichihara (JP)

(73) Assignee: Idemitsu Kosan Co., Ltd., Tokyo (JP)

( * ) Notice: Under 35 U.S.C. 154(b), the term of this patent shall be extended for 0 days.

(21) Appl. No.: 09/603,534

(22) Filed: May 25, 2000

Related U.S. Application Data

(63) Continuation of application No. 09/093,733, filed on Jun. 9, 1998, now abandoned, which is a continuation of application No. 08/726,171, filed on Oct. 4, 1996, now abandoned, which is a continuation of application No. 08/395,467, filed on Feb. 28, 1995, now abandoned, which is a continuation of application No. 08/056,877, filed on May 5, 1993, now abandoned, which is a continuation of application No. 07/731,864, filed on Jul. 18, 1991, now abandoned, which is a continuation of application No. 07/259,733, filed on Oct. 19, 1988, now abandoned.

(30) Foreign Application Priority Data

Oct. 30, 1987 (JP) .................................................. 62-273418

(51) Int. Cl.[7] ........................... C10M 107/34; C09K 5/00
(52) U.S. Cl. ............................................. 508/579; 252/68
(58) Field of Search ................................ 508/579; 252/68

(56) References Cited

U.S. PATENT DOCUMENTS

| | | | | |
|---|---|---|---|---|
| 4,248,726 | 2/1981 | Uchinuma et al. | ..................... | 252/68 |
| 4,613,445 | 9/1986 | Haack et al. | ............................ | 252/75 |
| 4,755,316 | 7/1988 | Magid et al. | .......................... | 252/68 |

FOREIGN PATENT DOCUMENTS

| | | |
|---|---|---|
| 55-58298 | 1/1980 | (JP) . |
| 57-42119 | 6/1982 | (JP) . |
| 57-63395 | 8/1982 | (JP) . |
| 61-281199 | 3/1986 | (JP) . |

OTHER PUBLICATIONS

Research Disclosure 17463 (Oct. 1978).
UCON–Fluids and Lubricants, 1–4, 9, 16, 17, 19, 22 (1981).
Chemical Abstracts vol. 90, No. 10, 124 (1979).
JIS K 2211 (1983), "Refrigerating Machine Oils".
"Mippeigata Reitoki (Closed–Type Refrigerating Machine)", Nihon Reito Kyokai,k 18–21 170–191 (1981).
"Kaitei Reito Kogaku (Refrigeration Engineering–Revised Editon)" Korano Corporation, 65–69 (1967).
"Reito Kikai Setsubi (Refrigerating Machine Facilities)", Sankaido 57–63 (1984).
"Abura Kagaku (Oil Chemistry)", vol. 29, No. 9, 17 (1980).
"Junkatsu (Lubrication)", vol. 24, No. 8, 57–61 (1979).
"Nisseki Technical Review", vol. 18, No. 5, 25–36 (1976).
"Freon Regrigerant", Mistui Fluorochemical Company, 1–33.
English Translations of Pertinent Portions of Oppositions Filed in Japan.

*Primary Examiner*—Ellen M. McAvoy
(74) *Attorney, Agent, or Firm*—Oblon, Spivak, McClelland, Maier & Neustadt, P.C.

(57) ABSTRACT

A lubricating oil for a flon refrigerant, containing a polyglycol compound having a kinematic viscosity at 40° C. of at least 30 cSt, a viscosity index of at least 150 and a water content of not more than 200 ppm as a main component. The lubricating oil of the present invention has good stability in the presence of a flon refrigerant, does not cause the copper plating phenomenon and has good compatibility with not only flon-11 and flon-12 but also sparingly soluble refrigerants such as hydrogen-containing flon compounds and perfluoroalkane.

6 Claims, No Drawings

US 6,191,082 B1

LUBRICATING OIL FOR FLON REFRIGERANT

This application is a continuation of Ser. No. 09/093,733, filed Jun. 9, 1998, now abandoned; which is a continuation of Ser. No. 08/726,171, filed Oct. 4, 1996, now abandoned; which is a continuation of Ser. No. 08/395,467, filed Feb. 28, 1995, now abandoned; which is a continuation of Ser. No. 08/056,877, filed May 5, 1993, now abandoned; which is a continuation of Ser. No. 07/731,864, filed Jul. 18, 1991, now abandoned; which is a continuation of Ser. No. 07/259,733, filed Oct. 19, 1988, now abandoned.

BACKGROUND OF THE INVENTION

1. Field of the Invention

The present invention relates to a lubricating oil for flon refrigerant and more particularly to a lubricating oil containing, as a main component, polyglycol compound with high viscosity and small water content, which is suitable for a lubricant in refrigerators using a flon compound as a refrigerant and so forth.

2. Description of the Related Arts

Polyglycol compounds have heretofore been used as lubricating oils for refrigerators and so forth. When they are used in an open-type refrigerator and so forth, an evaporation loss is large because their viscosities are relatively low. Particularly when they are used in a high-speed and multi cylinder refrigerator, the amount of oil consumed is considerably large, and thus they are unsuitable for practical use. Moreover, when they are used in closed type and half-closed type refrigerators and so forth, they suffer from disadvantages in that the amount of oil recycled is increased and cooling performance is decreased. Conventional polyglycol compounds, when used as refrigerator oils and so forth, produce the copper plating phenomenon on the iron surface in refrigerators (this copper plating phenomenon means a phenomenon that copper eluted from copper pipes covers the iron surface) and thus have a danger of causing unsatisfactory working of vane, bearings and so forth.

The present inventors have studied to overcome the above defects of conventional polyglycol compounds and to develop a polyglycol compound having suitable properties as refrigerator oils and so forth. As a result, it has been found that water contained in polyglycol compounds is responsible for the above copper plating phenomenon. It has further been found that polyglycol compounds having a small water content and a high viscosity do not have a danger of causing the copper plating phenomenon and have good compatibility with various flon compounds to be used as refrigerants for refrigerators and so forth.

SUMMARY OF THE INVENTION

The present invention relates to a lubricating oil for a flon refrigerator, containing a polyglycol compound having a kinematic viscosity at 40° C. of at least 30 cSt, a viscosity index of at least 150 and a water content of not more than 200 ppm as a main component.

DESCRIPTION OF PREFERRED EMBODIMENTS

The lubricating oil of the present invention contains a polyglycol compound as a main component. The polyglycol compound has a kinematic viscosity at 40° C. of at least 30 cSt, preferably 80 to 1,000 cSt and more preferably 120 to 800 cSt. If the kinematic viscosity at 40° C. is less than 30 cSt, the amount of oil consumed or the amount of oil recycled is increased by evaporation and, furthermore, sealing properties are poor. The viscosity index of the polyglycol compound is at least 150 and preferably at least 170. If the viscosity index is less than 150, lubricating properties at high temperatures are reduced.

Among various polyglycol compounds satisfying the above specified properties, polyglycol, polyglycolether or polyglycolester represented by the general formula (I) is preferable:

In the general formula (I), $R^1$ and $R^3$ each are hydrogen, an alkyl group having 1 to 20 carbon atoms, preferably 1 to 10 carbon atoms, or an acyl group, and $R^2$ is a straight or branched alkylene group having 2 to 4 carbon atoms. n is 10 or more, preferably 20 to 150 and more preferably 30 to 120.

The water content of the polyglycol compound of the present invention is not more than 200 ppm and preferably not more than 100 ppm. If the water content is more than 200 ppm, the copper plating phenomenon may be caused. Such low water content polyglycol compounds can be obtained by subjecting the polyglycol compound of the general formula (I) to vacuum heating or by contacting the polyglycol compound with silica gel, activated alumina, zeolite and the like. It is particularly preferred that the polyglycol compound be contacted with zeolite having a particle diameter of 0.1 to 10 mm, preferably 0.2 to 5 mm (natural zeolite or synthetic zeolite, e.g., molecular sieves 3A, 4A, 5A, 13X). Contacting conditions are not critical and can be determined appropriately depending on circumstances. If necessary, supersonic waves of 10 to 50 KHz may be applied at the contact treatment, and this application of supersonic waves increases a dephydration efficiency. Since the polyglycol compound having a small water content as obtained above is hygroscopic, it is preferably stored under shielding conditions of moisture. Concretely, the polyglycol compound is stably stored by placing it in a sealed container with a molding obtained by solidifying zeolite by itself or using a binder, e.g., magnesium oxide.

The lubricating oil of the present invention contains the polyglycol compound having high viscosity, high viscosity index and low water content as obtained above, as a main component. If necessary, an anti-wear agent, a chlorine-capturing agent, an antioxidant, a metal deactivator, a defoaming agent and so forth can be added. Preferred examples of the chlorine-capturing agent are phosphorous acid esters such as triphenyl phosphite and tricresyl phosphite. The amount of the chlorine-capturing agent added is 0.001 to 0.5% by weight.

The lubricating oil of the present invention is effective as a lubricant for refrigerators, coolers, heat pumps and so forth using a flon compound as a refrigerant. In the specification, flon compound means fluorine-containing alkane. Typical examples of the flon compound are trichloromonofluoromethane (flon-11) and dichloro-difluoromethane (flon-12). The lubricating oil of the present invention has good compatibility or solubility with, as well as flon-11 and flon-12, hydrogen-containing flon and perfluoroalkane which are said to be sparingly compatible with the usual lubricating oil. Examples of such hydrogen-containing flons are 1,1-dichloro-2,2,2-trifluoroethane (flon-123), 1,1,1,2-tetrafluoroethane (flon-134a), 1-chloro-1,1-difluoroethane (flon-142b), 1,1-difluoroethane (flon-152a), trifluoromethane (flon-23) and monochlorodifluoromethane (flon-22). Examples of perfluoroalkane are 1,1,1,2,2,2-hexafluoroethane (flon-116) and tetrafluoromethane (flon-14).

The lubricating oil of the present invention has good stability in the presence of a flon refrigerant, does not cause the copper plating phenomenon, and has a low two phase separation temperature not only for flon-11 and flon-12 but also for sparingly soluble refrigerants such as hydrogen-containing flon compounds and perfluroalkane, i.e., has good compatibility therewith. Moreover the lubricating oil of the present invention has advantages in that anti-seizure properties are good, the amount of oil consumed by evaporation is small, and the amount of oil recycled can be decreased.

Accordingly the lubricating oil of the present invention is effectively used as a lubricating oil for refrigerators, coolers (particularly air conditioners for cars), heat pumps and so forth, using various flon compounds as refrigerants.

The present invention is described in greater detail with reference to the following examples.

Examples 1 to 3, Comparative Example 1 to 3, and Reference Examples 1 to 4

The mineral oil, alkylbenzene and polyglycol samples shown in Table 1 were evaluated by the following methods.

The results are shown in Table 2. Two Phase Separation Temperature of Flon-22

A sample and flon-22 were mixed in a ratio of 2 to 8 (by weight) and a temperature at which the mixture was separated into two phases was measured.

| Two Phase Separation Temperature | |
|---|---|
| X | More than 10° C. |
| ○ | 10 to 0° C. |
| ⊙ | Less than 0° C. |

Falex Seizure Test

Measured according to ASTM D 3233 and indicated in terms of seizure load (pounds).

Shield Tube Test

A 2:1 (by weight) mixture of a sample and flon-22 was placed in a glass tube along with a catalyst of iron, copper and aluminum and sealed. After heating at 175° C. for 720 hours, the appearance and the formation of precipitate were examined.

Evaporation Test

According to JIS C-2320, 20 g of a sample was placed in a beaker and heated at 140° C. for 24 hours, and thereafter the amount lost by evaporation (wt %) was measured.

TABLE 1

| Sample No. | Type of Sample | Kinematic Viscosity at 40° C. (cSt) | Viscosity Index | Average Molecular Weight | Water Content (ppm) |
|---|---|---|---|---|---|
| I | Paraffinic Mineral Oil | 93 | 92 | 580 | 20 |
| II | Naphthenic Mineral Oil | 97 | 43 | 585 | 32 |
| III | Alkylbenzene | 29 | <0 | 340 | 25 |
| IV | Polyglycol *1 | 20 | 171 | 500 | 250 |
| V | Polyglycol *2 | 227 | 213 | 1900 | 280 |
| VI | Polyglycol *3 | 616 | 251 | 3000 | 320 |
| VII | Dehydrated Polyglycol *4 | 616 | 251 | 3000 | 50 |
| VIII | Dehydrated Polyglycol *5 | 616 | 251 | 3000 | 100 |
| IX | Water-added Polyglycol *6 | 616 | 251 | 3000 | 2000 |
| X | Dehydrated Polyglycol *7 | 46 | 190 | 1000 | 100 |

*1 Unilube 50 MB-5 produced by Nippon Yushi Co., Ltd.
*2 Unilube MB-38 produced by Nippon Yushi Co., Ltd.
*3 Unilube MB-700 produced by Nippon Yushi Co., Ltd.
*4 Dehydrated Unilube MB-700
*5 Dehydrated Unilube MB-700
*6 Unilube MB-700 added with water
*7 Dehydrated Unilube MB-11 by Nippon Yushi Co., Ltd.

TABLE 2

| No. | Sample No. | Two-Phase Separation Temperature (° C.) | Saizure Test (pounds) | Shield Tube Test Appearance | Shield Tube Test Precipitate | Evaporation Test (wt %) |
|---|---|---|---|---|---|---|
| Reference Example 1 | I | X | 400 | Good | None | 0.5> |
| Reference Example 2 | II | X | 450 | Yellow-brown | Precipitated | 0.5> |
| Reference Example 3 | III | ⊙ | 250 | Good | None | 20.3 |
| Comparative Example 1 | IV | ⊙ | 650 | Little copper plating | None | 27.6 |
| Comparative Example 2 | V | ⊙ | 680 | Little copper plating | None | 15.8 |

TABLE 2-continued

| Sample No. | Sample No. | Two-Phase Separation Temperature (° C.) | Saizure Test (pounds) | Shield Tube Test | | Evaporation Test (wt %) |
|---|---|---|---|---|---|---|
| | | | | Appearance | Precipitate | |
| Comparative Example 3 | VI | ⊙ | 690 | Little copper plating | None | 13.7 |
| Example 1 | VII | ⊙ | 700 | Good | None | 12.4 |
| Example 2 | VIII | ⊙ | 690 | Good | None | 12.6 |
| Reference Example 4 | IX | ⊙ | 650 | Considerable copper plating | None | 16.3 |
| Example 3 | X | ⊙ | 670 | Good | None | 17.5 |

What is claimed is:

1. A lubricating oil for a flon refrigerant, containing as the main component a polyglycol compound having a kinematic viscosity at 40° C. of at least 30 cSt, a viscosity index of at least 150 and a water content of between 50 and 200 ppm.

2. The lubricating oil as claimed in claim 1 wherein the polyglycol compound is represented by the general formula:

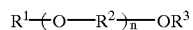

(wherein $R^1$ and $R^3$ are each hydrogen, an alkyl group having 1 to 20 carbon atoms, or an acyl group, $R^2$ is a straight or branched alkylene group having 2 to 4 carbon atoms, and n is a number of at least 10).

3. The lubricating oil as claimed in claim 1 wherein water content of the polyglycol compound is not more than 100 ppm.

4. The lubricating oil as claimed in claim 1 wherein a flon refrigerant is fluorine-containing alkane selected from the group consisting of trichloromonofluoromethane, dichlorodifluoromethane, 1,1-dichloro-2,2,2-trifluoroethane, 1,1,1,2-tetrafluoroethane, 1-chloro-1,1-difluoroethane, 1,1-difluoroethane, trifluoromethane, monochlorodifluoromethane, 1,1,1,2,2,2-hexafluoroethane and tetrafluoromethane.

5. A lubricating oil for a flon refrigerant containing as the main component a polyglycol compound having a kinematic viscosity at 40° C. of at least 30 cSt, a viscosity index of at least 150 and a water content prior to admixture with the flon refrigerant, of between about 50 ppm and 100 ppm.

6. A method of lubricating a car air conditioner which comprises introducing into said air conditioner a lubricant oil, containing as the main component a polyglycol compound having a kinematic viscosity at 40° C. of at least 30 cSt, of viscosity index of at least 150 and a water content of less than 200 ppm.

* * * * *